United States Patent
Kelley et al.

(10) Patent No.: US 9,183,620 B2
(45) Date of Patent: Nov. 10, 2015

(54) AUTOMATED TILT AND SHIFT OPTIMIZATION

(71) Applicant: International Business Machines Corporation, Armonk, NY (US)

(72) Inventors: John F. Kelley, Clarkesville, GA (US); Kristin S. Moore, Charleston, SC (US); Todd P. Seager, Orem, UT (US)

(73) Assignee: International Business Machines Corporation, Armonk, NY (US)

( * ) Notice: Subject to any disclaimer, the term of this patent is extended or adjusted under 35 U.S.C. 154(b) by 37 days.

(21) Appl. No.: 14/085,983

(22) Filed: Nov. 21, 2013

(65) Prior Publication Data

US 2015/0138383 A1 May 21, 2015

(51) Int. Cl.
*G06T 5/00* (2006.01)
*H04N 5/232* (2006.01)

(52) U.S. Cl.
CPC ............ *G06T 5/006* (2013.01); *H04N 5/23216* (2013.01); *H04N 5/23293* (2013.01); *G06T 2207/20101* (2013.01)

(58) Field of Classification Search
CPC ........................... H04N 5/2259; H04N 5/2356
USPC ...................... 348/333.08, 335, 341, 343, 344
See application file for complete search history.

(56) References Cited

U.S. PATENT DOCUMENTS

| | | | |
|---|---|---|---|
| 5,698,841 A | 12/1997 | Momoki | |
| 6,624,402 B2 | 9/2003 | Kaneko et al. | |
| 7,616,875 B2 | 11/2009 | Uchiyama | |
| 7,880,797 B2 | 2/2011 | Nanjo et al. | |
| 8,075,201 B2 | 12/2011 | Strong et al. | |
| 8,254,630 B2 | 8/2012 | Abe | |
| 8,274,548 B2 | 9/2012 | Fujita | |
| 8,395,682 B2 | 3/2013 | Soloman | |
| 2002/0118292 A1* | 8/2002 | Baron | 348/335 |
| 2006/0203090 A1* | 9/2006 | Wang et al. | 348/143 |
| 2007/0053675 A1 | 3/2007 | Pollard | |
| 2007/0270182 A1 | 11/2007 | Gulliksson et al. | |
| 2008/0107411 A1 | 5/2008 | Hope | |

(Continued)

FOREIGN PATENT DOCUMENTS

| | | |
|---|---|---|
| JP | 06289284 A | 10/1994 |
| JP | 10206150 A | 8/1998 |

(Continued)

OTHER PUBLICATIONS

Amazon, Product, "Canon TS-E 24mm f/3.5L Tilt Shift Lens for Canon SLR Cameras", Retrieved on Jul. 26, 2013 from website: http://www.amazon.com/Canon-TS-E-24mm-Shift_Cameras/dp/B00>.

(Continued)

*Primary Examiner* — Nhan T Tran
*Assistant Examiner* — Chan Nguyen
(74) *Attorney, Agent, or Firm* — Nicholas L. Cadmus

(57) ABSTRACT

In a method for calculating corrections for tilt in an image, one or more processors receive a digitized image from a camera. The one or more processors initiate display of the digitized image in a screen on the camera, the screen having user-selectable focus points. The one or more processors receive from a user a focus point selection of an area of the displayed image to correct for tilt, and in response, the one or more processors correct the digitized image for tilt in the area such that an object is in focus in the area.

19 Claims, 7 Drawing Sheets

(56) References Cited

U.S. PATENT DOCUMENTS

| | | | |
|---|---|---|---|
| 2009/0034953 | A1 | 2/2009 | Hwang et al. |
| 2009/0096913 | A1 | 4/2009 | Wang et al. |
| 2010/0027983 | A1* | 2/2010 | Pickens et al. ............... 396/125 |
| 2010/0039522 | A1 | 2/2010 | Huang |
| 2010/0060748 | A1 | 3/2010 | Tsuchiya |
| 2010/0141802 | A1 | 6/2010 | Knight et al. |
| 2010/0182495 | A1 | 7/2010 | Murata |
| 2011/0069884 | A1 | 3/2011 | Zhang et al. |
| 2011/0280475 | A1 | 11/2011 | Singhal et al. |
| 2011/0293137 | A1 | 12/2011 | Gurman et al. |
| 2012/0007940 | A1 | 1/2012 | Michrowski et al. |
| 2012/0007942 | A1 | 1/2012 | Michrowski et al. |
| 2012/0051730 | A1 | 3/2012 | Cote et al. |
| 2012/0057051 | A1 | 3/2012 | Ito et al. |
| 2012/0069222 | A1 | 3/2012 | Steinberg et al. |
| 2012/0106937 | A1* | 5/2012 | Molin et al. ............... 396/121 |
| 2012/0133639 | A1 | 5/2012 | Kopf et al. |
| 2013/0033623 | A1* | 2/2013 | Matsuyama ............... 348/241 |
| 2013/0038788 | A1 | 2/2013 | Strong |
| 2013/0321312 | A1* | 12/2013 | Higashi et al. ............... 345/173 |
| 2014/0028839 | A1* | 1/2014 | Ishibashi ............... 348/140 |

FOREIGN PATENT DOCUMENTS

| | | |
|---|---|---|
| JP | 2007128009 A | 5/2007 |
| WO | 2012153503 A1 | 11/2012 |

OTHER PUBLICATIONS

Amazon, Product, "Canon TS-E 24mm 17mm f/4L Tilt Shift Lens for Canon", Retrieved on Jul. 26, 2013 from website: <http://www.the-digital-picture.com/Reviews/Canon-TS-E-17mm-f-4>.

Cambridge in Colour, "Using Tilt-Shift Lenses to Control Depth of Field", retrieved on Jul. 26, 2013 from website: <http://www.cambridgeincolour.com/tutorials/tilt-shift-lenses2.htm>.

Cambridge in Colour, "Using Tilt-Shift Lenses to Control Perspective", retrieved on Jul. 26, 2013 from website: <http://www.cambridgeincolour.com/tutorials/tilt-shift-lenses1.htm>.

Heinisch et al., "Novel Technique for Measurement of Centration Errors of Complex, Completely Mounted Multi-Element Objective Lenses", Trioptics GmbH, Hafenstrasse, Wedel, Germany.

"Hyperfocal Distance Guide", Hyperfocal Distance, Printed: Oct. 23, 2012, Copyright 2002 Don Fleming, <http://www.dofmaster.com/hyperfocal.html>.

Liu, "A Camera Phone Based Currency Reader for the Visually Impaired", Assets, Oct. 13-15, 2008, Halifax, Nova Scotia, Canada.

Meunier et al., "Radar image modeling: A 3D Spectral domain approach", 0-8194-2211-8/96, SPIE vol. 2823, pp. 149-159.

"pCam Film+Digital Calculator", Printed: Oct. 23, 2012; <http://www.davideubank.com/Good_Focus/pCAM_Film+Digital_Calculator.html>.

Tilt Shift Maker, "Create tilt-shift style photos in 3 easy steps", retrieved on Jul. 26, 2013 from website: <http://tiltshiftmaker.com>.

Wikipedia, "Scheimpflug principle", retrieved on Nov. 19, 2013 from website: <http:en.wikipedia.org/wiki/Scheimpflug_principle>.

Wikipedia, "Tilted plane focus", retrieved on Nov. 19, 2013 from website: <http:en.wikipedia.org/wiki/Tilted_plane_focus>.

Wikipedia, "View Camera", retrieved on Nov. 19, 2013 from website: <http:en.wikipedia.org/wiki/Tilt_(view_camera)>.

* cited by examiner

AUTOMATED TILT AND SHIFT OPTIMIZATION

FIELD OF THE INVENTION

The present invention relates generally to the field of photography, and more particularly to automatically correcting tilt and shift of an image.

BACKGROUND OF THE INVENTION

When an object with parallel lines is positioned at an angle to a camera, the resulting image often appears distorted. This distortion is known as a keystone effect. The keystone effect is a distortion of the image dimensions, causing the tall object to look like a trapezoid which is the shape of an architectural keystone. The keystone effect may be corrected by shifting the lens of the image capturing device. The keystone effect is further exaggerated if the image capturing device is at a sharper angle to parallel lines in the subject.

Although usually discussed together, tilt and shift are two mechanisms that result in two completely different outcomes. The axis of a lens in a camera is normally perpendicular to an image sensor. Tilt results in a depth of field plane that is not parallel to the image sensor. Tilt alters depth of field and drastically alters the shape of the depth of field plane. Depth of field is the part of a still image or video that is "in focus", as rendered by the optical elements of an imaging system. Tilt movements can be used for selective focus, such as enabling the floor of a room to be in focus in camera-leveled composition, or simulating a miniature scene. Moving the lens perpendicularly along the axis of the image causes shift, which can be observed easily by a camera operator when the camera operator previews an image.

SUMMARY

Aspects of embodiments of the present invention disclose a method, computer program product, and computer system for calculating corrections for tilt in an image. One or more processors receive a digitized image from a camera. The one or more processors initiate display of the digitized image in a screen on the camera, the screen having user-selectable focus points. The one or more processors receive from a user a focus point selection of an area of the displayed image to correct for tilt, and in response, the one or more processors correct the digitized image for tilt in the area such that an object is in focus in the area.

DETAILED DESCRIPTION

Figure 1:
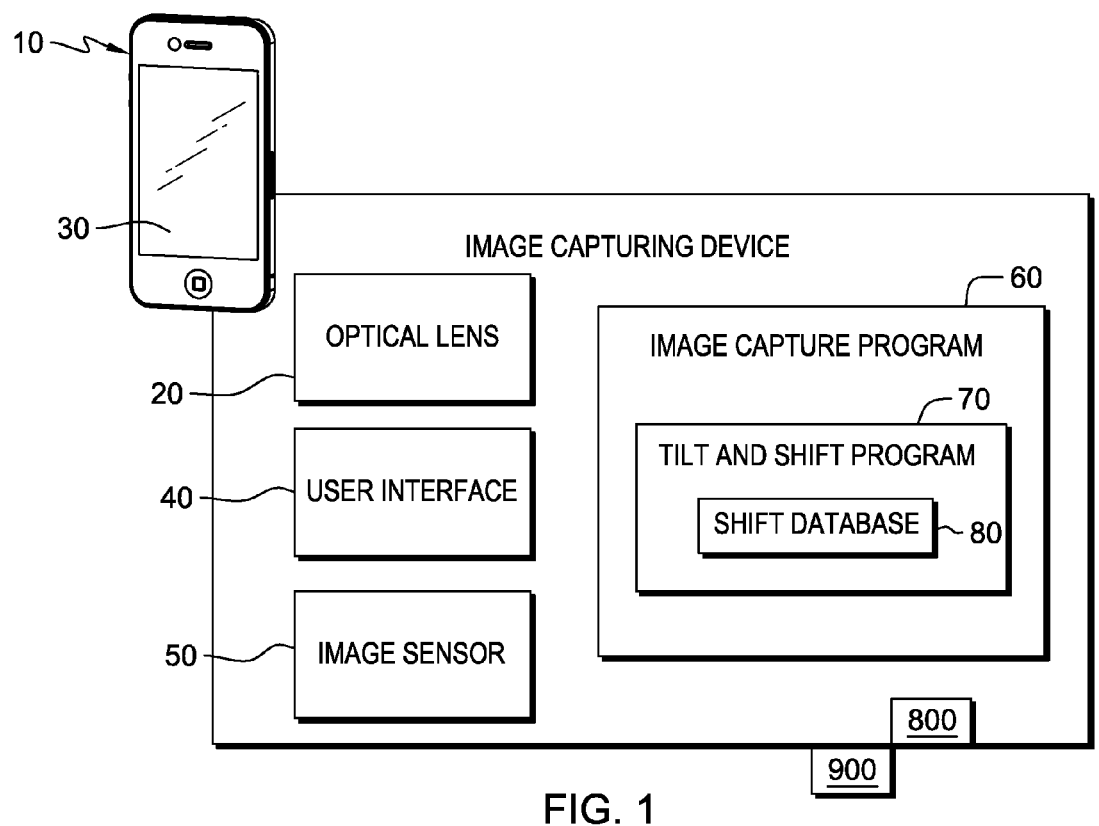
FIG. 1 is a functional block diagram of an image capturing device, in accordance with one embodiment of the present invention.

Tilt-shift lenses are used for capturing images in challenging environments, particularly in architectural, real estate, landscape, and product photography, which are often affected by the keystone effect. Existing tilt-shift lenses require manual adjustments for tilt, shift, and focus. In rare cases, a tilt-shift lens may zoom. These lenses are a challenge to operate, and users often find it difficult to predict the optical results caused by altering properties of the lenses. Another challenge is that tilt-shift lenses are manual-focus only. A user may prepare to capture an image of a building by moving the camera, adjusting for shift, and adjusting for tilt. The user must then focus the lens. Focusing changes the perspective (related to shift), and the focal plane (related to tilt). The user then uses an iterative process to achieve the desired result, having to compensate for ever-changing optical dynamics. Typically, this series of manual steps takes a great deal of experience and several iterations to achieve a desirable result.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

The present invention will now be described in detail with reference to the Figures. FIG. 1 is a functional block diagram of image capturing device 10, in accordance with one embodiment of the present invention. FIG. 1 provides only an illustration of one embodiment and does not imply any limitations with regard to the environments in which different embodiments may be implemented.

In the depicted embodiment, image capturing device 10 is a computing device integrated with an imaging device. For example, image capturing device 10 can be a smart phone equipped with a digital camera, or, alternatively, an imaging device in communication with a separate distinct computing device. In other embodiments, image capturing device 10 may be a digital camera, digital video camera, a computer with an integrated digital camera, or any programmable electronic device capable of capturing and displaying digital images. Digital images may be still photographs or moving images such as videos or movies. Image capturing device 10 includes optical lens 20, display 30, user interface 40, image sensor 50, image capture program 60, tilt and shift program 70, and shift database 80. In one embodiment, image capturing device 10 includes components described in reference to FIG. 5.

Optical lens 20 is integrated with image capturing device 10. In the depicted embodiment, optical lens 20 is permanently fixed to image capturing device 10. Optical lens 20 operates to focus light onto image sensor 50.

The aperture (not shown) is the opening through which light travels through optical lens 20 and into image capturing device 10. The aperture may be located in different spots within optical lens 20. For example, the aperture may be a ring or other fixture that holds an optical element in place, or it may be a diaphragm placed in the optical path to limit the amount of light that emitted through the lens. In the depicted embodiment, the aperture may be adjusted to control the amount of light entering image capturing device 10.

The lens focal length of optical lens 20 may be adjusted by the operator of image capturing device 10 if the optical lens is not a fixed focal length lens. The lens focal length is the distance over which the rays of light are focused on a focal point. The focal point is the point at which the rays of light converge and are focused. Adjusting the lens focal length of optical lens 20 will also adjust the f-number of optical lens 20, which is the ratio of the lens focal length to the diameter of the aperture. The f-number is set in order to adjust the aperture diameter in order to control the amount of light entering imaging device 10. When written, the f-number is usually preceded by f/. Therefore, an f-number of 4 is written as f/4. For example, if optical lens 20 is a 100 mm focal length lens with an f-number setting of f/4, optical lens 20 will have an aperture diameter of 25 mm.

Display 30 is connected to image capturing device 10. In the depicted embodiment, display 30 is a liquid crystal display (LCD) fixed to image capturing device 10. In another embodiment, display 30 is a display monitor connected to a computer with an integrated digital camera. In another embodiment, display 30 is a display monitor connected to a network, or LAN. In yet another embodiment, display 30 is a monitor attached to image capturing device 10 via a cable. Display 30 operates to display a digital image captured by image capturing device 10. A digital image is comprised of a set of pixels. In one embodiment, a digital image may be a still image. In another embodiment, a digital image may be a digital video.

User interface 40 operates on image capturing device 10 and works in conjunction with display 30 to visualize content such as images captured by image capturing device 10. User interface 40 may comprise one or more interfaces such as an operating system interface and application interfaces. In one embodiment, user interface 40 comprises an interface to image capture program 60, tilt and shift program 70, and shift database 80. In one embodiment, user interface 40 receives an image captured by image capture program 60 and sends the image to display 30.

Image sensor 50 is integrated with image capturing device 10. Image sensor 50 is a detector that converts an optical image into an electronic signal. The electrical signals are quantized by an analog-to-digital (A/D) converter (not shown). In one embodiment, image sensor 50 may be a charge-coupled device (CCD) sensor. In another embodiment, image sensor 50 may be a complementary metal-oxide semiconductor (CMOS) sensor or another type of sensor. In yet another embodiment, image sensor 50 could be a specialized sensor for medical imaging.

In the depicted embodiment, light passes through optical lens 20 and reaches image sensor 50, which contains an array of pixel sensors that are evenly distributed over image sensor 50. A pixel sensor may be comprised of a semiconductor material that absorbs light photons and generates electronic signals. In one embodiment, image sensor 50 may also contain autofocus pixel sensors. The autofocus pixel sensors may be an array that is arranged in various patterns. In another embodiment, the autofocus pixel sensors may be contained on a sensor that is separate from image sensor 50.

Image capture program 60 is a standard image capture program. For example, image capture program 60 is a program operating on a digital camera, such as Nikon® Scene Recognition System. In the depicted embodiment, image capture program 60 receives and processes electronic signals from image sensor 50. Image capture program 60 sends the processed image to user interface 40 for display on display 30. In one embodiment, image capture program 60 operates to send image data for the processed image to tilt and shift program 70. Image data may include aperture, focal length, and plane of focus. Plane of focus is the point in an image capturing device where all of the rays of light converge and form a sharp image.

In one embodiment, image capture program 60 also manages autofocus capabilities of image capturing device 10. Autofocus capabilities utilize one or more autofocus pixel sensors to determine if the image is in focus and electromechanically adjusts the focus of image capturing device 10 if the image is not in focus. The user may use user interface 40 to operate image capture program 60 to select one or more focus points to set the photographer's focus point in the field of view of image capturing device 10. A focus point is a location in the field of view of image capture device 10 associated with an autofocus pixel sensor. Image capture program 60 then determines if the subject matter at the single focus point is in focus. If the subject matter at the single focus point is not in focus image capture program 60 electromechanically adjusts the focus until the subject matter is in focus.

If the autofocus program utilizes active autofocus, image capturing program 60 may use ultrasonic waves or triangulation of infrared light to determine the distance between the subject and image sensor 50. Active autofocus is a type of autofocus that determines correct focus by measuring distance to the subject independently of the optical system. In one embodiment, an ultrasonic wave detector (not shown) may be used to determine distance. In another embodiment, an infrared light detector (not shown) may be used to determine distance. In yet another embodiment, another method may be used to determine distance. If the autofocus program utilizes passive autofocus, image capture program 60 may use phase detection or contrast measurement to determine focus. Passive autofocus is a type of autofocus that determines correct focus by performing a passive analysis of the image that is entering the optical system. In one embodiment, image capture program 60 may be able to detect motion of the subject matter toward or away from the camera while maintaining focus on the subject matter.

In one embodiment, phase detection may also determine distance between the subject matter at a focus point and an autofocus pixel sensor associated with the focus point. Phase detection may function in a way similar to a rangefinder, which is a focusing mechanism that allows the user to measure the distance to the subject matter. A rangefinder shows two identical images. One image moves when a calibrated wheel on the image capturing device is turned. After the two images overlap and fuse into one, the distance is read off the calibrated wheel. For example, when utilizing phase detection imaging device 10 contains a beam splitter (not shown) that captures light from opposite sides of the lens and diverts light to autofocus sensors located separately from image sensor 50. This generates two separate images which are compared for light intensity and separation error in order to determine whether the image is in or out of focus. During this comparison, phase detection is used to determine the distance between the subject matter at a focus point to the associated autofocus pixel sensor. For example, digital cameras measure distance to the subject matter electronically.

In one embodiment, image capture program 60 operates to receive tilt and shift values from tilt and shift program 70. In another embodiment, image capture program 60 receives tilt and shift values and image capture program 60 adjusts lens 20 based on the tilt and shift values received from tilt and shift program 70. Image capture program 60 may also display tilt and shift values on display 30. Tilt and shift values will be discussed in more detail below.

Tilt and shift program 70 calculates corrections for tilt and shift in an image captured by image capturing device 10. In one embodiment, tilt and shift program 70 can adjust image capturing device 10 based on those calculations. In another embodiment, tilt and shift program 70 sends calculations to image capture program 60 so image capture program 60 can adjust image capturing device 10. For example, lens 20 is adjusted. In the depicted embodiment, tilt and shift program 70 receives image data from image capture program 60. For example, image data may be the location of focus points, the distance between each focus point and its associated pixel sensor, and current tilt values. Tilt and shift program 70 generally uses received image data to calculate corrections for tilt and shift of an image.

Tilt results in a depth of field plane that is not parallel to an image sensor. Tilt alters the angle of the depth of field relative to the image sensor. When a lens tilts, the angle of the depth of field plane to the image sensor goes from initially infinity (parallel), to a lesser value. The depth of field plane is no longer a fixed width, and forms the shape of a wedge as viewed from the side. Depth of field is the part of a still image or video that is "in focus", as rendered by the optical elements of an imaging system. Tilt can be used for selective focus, such as simulating a miniature scene.

Shift is a natural phenomenon in optics that causes perspective distortion that can be observed by a user operating image capturing device 10 when the user views a preview of an image on display 30. For example, shift occurs when the user levels image capturing device 10 and captures an image of a tall building. Because of the height of the tall building, the user points the camera up in order to capture an image of the entire building. In the captured image, the building appears narrow toward the top.

In architectural photography, the user will typically keep the image capturing device level. When adjusting for shift, the user will shift the lens of the image capturing device up to make the converging lines of vertical structures parallel. In doing so, the composition will also migrate up in relation to the borders of the frame of the image. The user then must adjust the angle of the image capturing device to compensate for the migration of the original composition. The user may need to repeat the process of shifting the lens and adjusting the angle the image capturing device up and then down in order to achieve the desired result.

In the depicted embodiment, the user operating image capturing device 10, using UI 40, selects tilt and shift program 70 before an image is captured. For example, to turn on the functionality of tilt and shift program 70, the user, using UI 40, selects a setting of image capture program 60 to turn on tilt and shift correction. In another embodiment, the user selects only tilt mode to correct for tilt of the image. In yet another embodiment, the user selects only shift mode to correct for shift of the image.

In the depicted embodiment, the user uses tilt mode of tilt and shift program 70 to correct tilt of the image. In tilt mode, tilt and shift program 70 creates a depth map for the preview of the image. In the depicted embodiment, a depth map represents the distance from each pixel of the captured image to the autofocus pixel sensor associated with each pixel. The user, using UI 40, selects at least one focus point to be designated as a focus point that is in the focus plane, or in focus. In the depicted embodiment, tilt and shift program 70 designates the focus points that are not selected by the user as focus points that are outside the focus plane, or out of focus. In another embodiment, tilt and shift program 70 prompts the user to select focus points that are out of focus.

Based on the at least one selected focus point, tilt and shift program 70 determines how to correct for tilt. In one embodiment, tilt and shift program 70 calculates the corrective degree of tilt by using the Scheimpflug principle. The Scheimpflug principle is a geometric rule that describes the orientation of the plane of focus of an image capturing device when the lens plane is not parallel to the image plane. The Scheimpflug principle can be used to calculate the degree of rotation of the plane of focus required so that the image plane is parallel to the plane of focus. In one embodiment, tilt and shift program 70 causes a range of calculated tilt values to be displayed on display 30. The range of calculated tilt values is a range of acceptable degrees of tilt within which tilt is corrected. Tilt and shift program 70 prompts the user to approve or disapprove of the range of tilt values. In another embodiment, tilt and shift program 70 prompts the user to enter a range of tilt values. For example, tilt and shift program 70 sends the range of calculated tilt values and an instruction to display the range of calculated tilt values on display 30 to image capture program 60.

In the depicted embodiment, the user uses shift mode of tilt and shift program 70 to correct shift of the image. In shift mode, the user, using UI 40, selects at least two groups of shift points. Each group is comprised of at least one selected focus point (e.g. shift point). The user indicates a spatial relationship between at least two groups as parallel, vertical, or horizontal. For example, the user indicates that two groups of shift points must be parallel. Tilt and shift program 70 measures the angle between the current location of one group of shift points and the desired location of the one group of shift points with perspective to the location of the second group of shift points. This process is described in more detail in FIG. 2C.

Tilt and shift program 70 accesses shift database 80 to determine how to shift optical lens 20 to correct shift based on the user's selections for tilt and shift. In the depicted embodiment shift database 80 is a component of tilt and shift program 70. In one embodiment, shift database 80 is a pre-defined collection of rules and instructions tilt and shift program 70 will use to correct shift. For example, shift database 80 includes rules that determine how to adjust optical lens 20 to correct shift based on image data determined by tilt and shift program 70. In another example, shift database 80 includes instructions that describe how the user can adjust image capturing device 10 in order to adjust the shift of optical lens 20. An instruction may, for example, direct a user to capture an image from an elevation that is five feet higher than the user's current location.

In one embodiment, tilt and shift program 70 determines a range of shift values based on the groups of shift points selected by the user, the spatial relationships between the groups of shift points, and the rules determined from shift database 80. In one embodiment, the range of calculated shift values is a range of acceptable shift values within which shift is corrected. In one embodiment, tilt and shift program 70 causes a range of determined shift values to be displayed on display 30. For example, tilt and shift program 70 sends the range of determined shift values and an instruction to display the range of calculated tilt values on display 30 to image capture program 60.

In another embodiment, tilt and shift program 70 can be used in a video application where image capturing device 10 is a video camera. The user selects a range of tilt and shift values before filming the video. Tilt and shift program 70 calculates corrections for tilt and shift for each frame of the video. Tilt and shift program causes image capture program 60 to correct optical lens 20 for tilt and shift as each frame is filmed. In another embodiment, tilt and shift program 70 prompt the user to make adjustments. For example, an adjustment includes changing the distance between image capturing device 10 and the subject of the video.

Figure 2A:
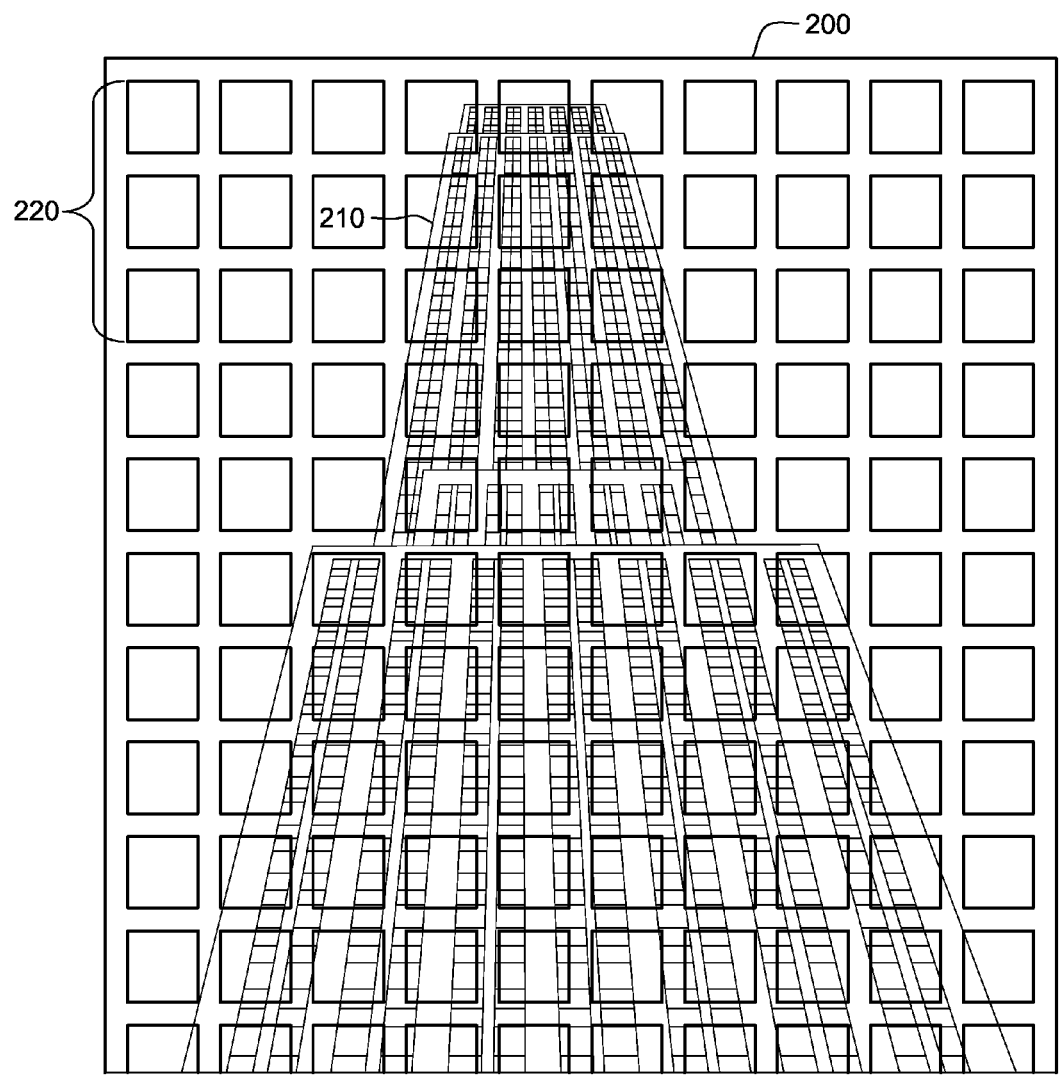
FIGS. 2A-C depict exemplary views of the user interface (UI) for image capture program 60 and tilt and shift program 70, in accordance with one embodiment of the present invention.
Figure 2B:
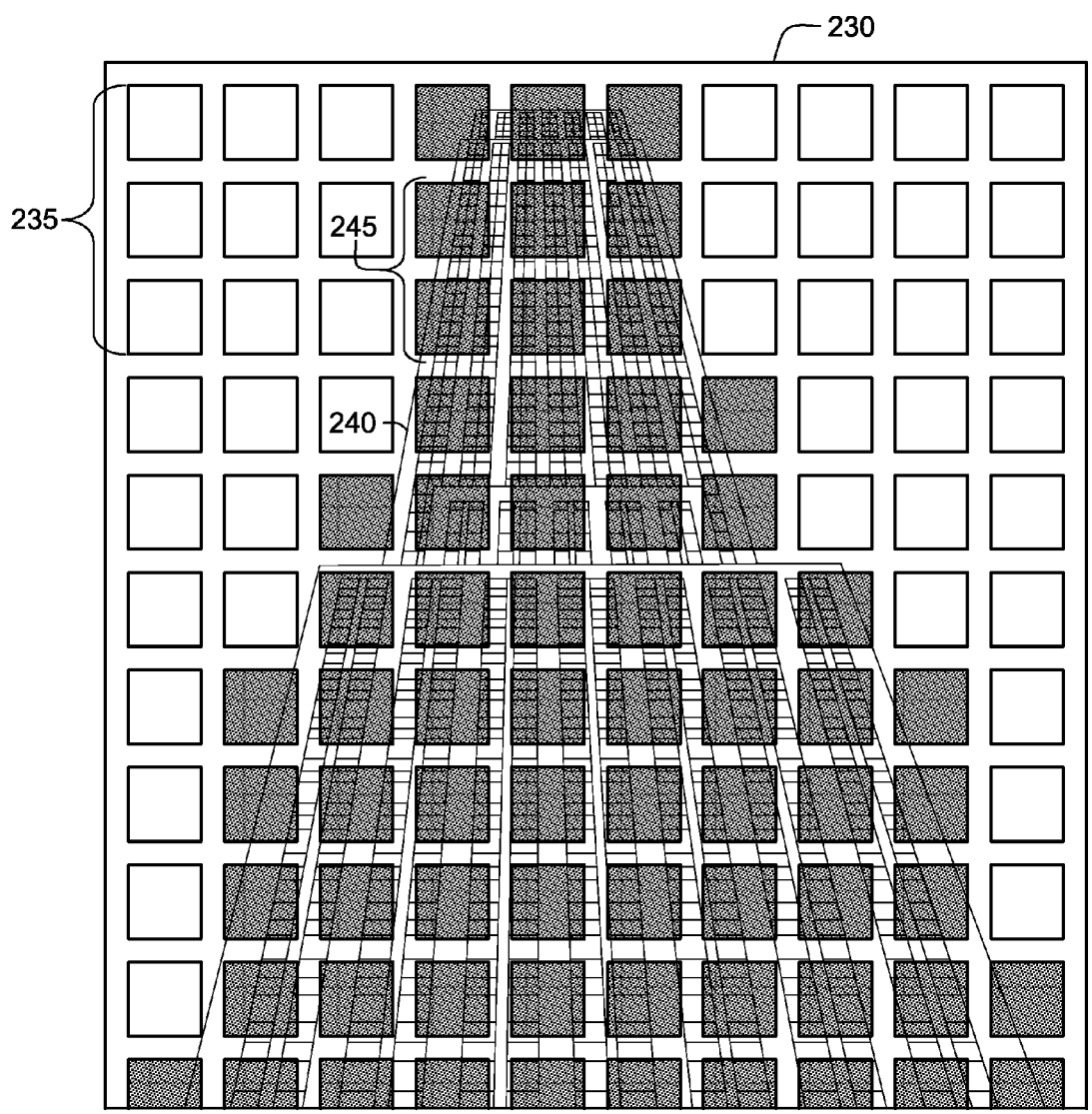
Figure 2C:
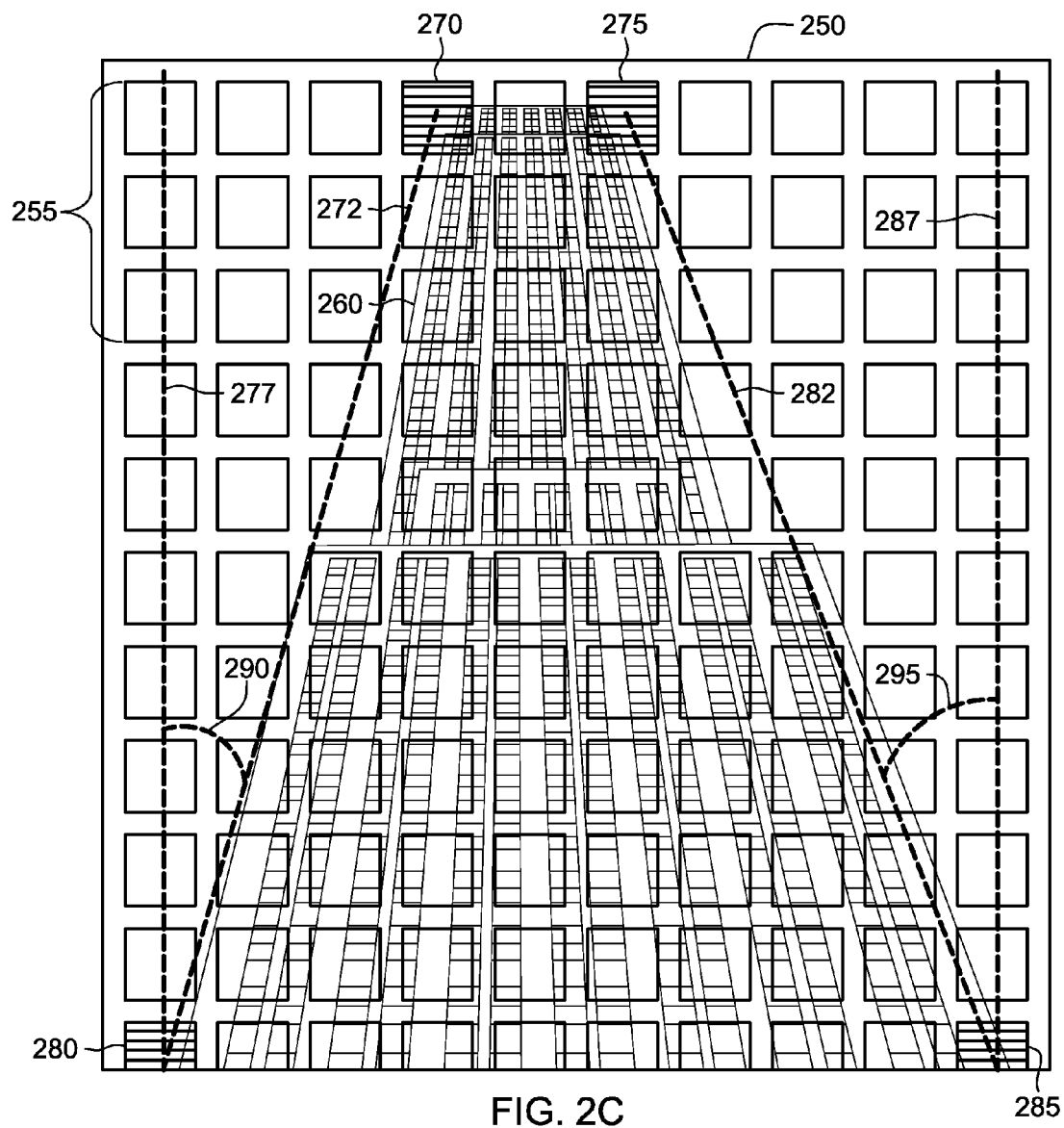

FIGS. 2A-C depict exemplary views of the user interface (UI) for image capture program 60 and tilt and shift program 70, in accordance with one embodiment of the present invention. A UI 200 of FIG. 2A, a UI 230 of FIG. 2B, and a UI 250 of FIG. 2C are each an example of user interface 40 of FIG. 1 and, in the depicted embodiment, allow a user to see displayed content from image capture program 60 and tilt and shift program 70.

In one embodiment, initially, a user operating image capturing device 10 positions image capturing device 10. The user, using UI 40, selects tilt and shift program 70. The user, using UI 40, captures an image of an object. Image capture program 60 receives image data. Image data may include aperture diameter, focal length of optical lens 20, and the distance between the subject matter at the user's focus point to the autofocus pixel sensor associated with the user's focus point. Image data may also include other parameters associated with the captured image and with image capturing device 10. Image capture program 60 sends image data to tilt and shift program 70. Tilt and shift program 70 receives image data from image capture program 60.

FIG. 2A depicts a display of UI 200 when image capture program 60 is operating on image capturing device 10. UI 200 displays a preview of an image received from image capture program 60. In the depicted embodiment, the image is of a tall building that was taken at ground level. When an image of a tall object is captured from ground level, the user operating the image capturing device must point the image capturing device upwards in order to capture an image of the entire tall object. The resulting image is often distorted, as it is shown on UI 200. The image includes object 210. In the depicted embodiment, object 210 is a tall building. Because of the height of object 210, as well as the angle from which the image was captured, the preview of the image appears to be distorted. Focus points 220 are locations in the field of view of image capturing device 10 and each focus point of focus points 220 is associated with an autofocus pixel sensor.

FIG. 2B depicts a display of UI 230 when tilt and shift program 70 is in tilt mode. UI 230 displays the image received from image capture program 60. The image shown in UI 230 is the same image shown in UI 200 of FIG. 2A. Focus points 235 are locations in the field of view of image capturing device 10 are each associated with an autofocus pixel sensor. Focus points 235 are the same focus points as focus points 220 in FIG. 2A. The image includes object 240. Object 240 is a tall building and is the same object as object 210 in FIG. 2A.

In the depicted embodiment, the user, using UI 40, selects which focus points of focus points 235 will be in focus in the final image. In the depicted embodiment, the user selects selected focus points 245 as the focus points that will be in focus in the final image. In the depicted embodiment, tilt and shift mode 70 darkens selected focus points 245 after the user selects each of selected focus points 245. The change in appearance allows the user to easily differentiate between selected focus points 245 and focus points 235. In another embodiment, tilt and shift program 70 changes the color of the selected focus points 245. In yet another embodiment, tilt and shift program 70 does not alter the appearance of selected focus points 245.

In another embodiment, tilt and shift program 70 displays a depth map before the user selects the focus points that will be in focus. In this embodiment, a depth map is an overlay displayed over the captured image that indicates which focus points are in focus and which focus points are out of focus. Tilt and shift program 70 uses the received image data to determine which focus points are in focus and which focus points are out of focus. For example, tilt and shift program 70 selects the focus points that the depth map indicates are in focus as selected focus points 245. In another example, the user uses the depth map to select selected focus points 245.

Tilt and shift program 70 determines that selected focus points 245 are the focus points that must be in the focus plane. In another embodiment, tilt and shift program 70 determines that the focus points that were not selected are out of focus. Tilt and shift program 70 determines that focus points that are not selected are outside of the focus plane. In the depicted embodiment, tilt and shift program 70 calculates the degree of tilt by using the Scheimpflug principle. In one embodiment, tilt and shift program 70 displays a range of tilt values. The range of calculated tilt values is a range of acceptable degrees of tilt at which tilt does not distort the final image. Tilt and shift program 70 prompts the user to approve or disapprove of the range of tilt values. In another embodiment, tilt and shift program 70 prompts the user to enter a range of tilt values. Tilt and shift program 70 prompts the user to approve or disapprove of the range of tilt values. In another embodiment, tilt and shift program 70 prompts the user to enter a range of tilt values.

Tilt and shift program 70 sends an instruction to image capture program 60 to electromechanically adjust the focus of image capturing device 10 so that selected focus points 245 are in focus.

FIG. 2C depicts a display of UI 250 when tilt and shift program 70 is in shift mode. UI 250 displays the image received from image capture program 60. The image shown in UI 250 is the same image shown in UI 200 of FIG. 2A and UI 230 of FIG. 2B. Focus points 255 are locations in the field of view of image capturing device 10 and are each associated with an autofocus pixel sensor. Focus points 255 are the same focus points as focus points 220 in FIG. 2A and focus points 235 in FIG. 2B. The image includes object 260. Object 260 is a tall building and is the same object as object 210 in FIG. 2A and object 240 in FIG. 2B.

In the depicted embodiment, the user, using UI 40, selects shift points that will be used to correct shift. A shift point is a focus point selected by the user to be used to correct shift. In one embodiment, if the user is correcting for both tilt and shift, a shift point is a selected focus point. The user selects shift points 270, 275, 280, and 285. As the user selects each of shift points 270, 275, 280, and 285, the user selects a group for each shift point. In the depicted embodiment, each group is indicated by a pattern. Shift points 270 and 275 are in the same group, which is indicated by the horizontal line pattern shown for shift points 270 and 275. Shift points 280 and 285 are in the same group, which is indicated by the vertical line pattern shown for shift points 280 and 285. In the depicted embodiment, each selected shift point represents a corner of the building that is object 260.

In one embodiment, tilt and shift program 70 prompts the user to select a spatial relationship between at least two groups of shift points. The user, using UI 40, indicates that shift points 270 and 280 should be parallel to shift points 275 and 285, respectively, or that the arbitrary connection between points 270 and 280 is parallel to the connection between points 275 and 285. Tilt and shift program 70 determines that shift point 270 must be directly above shift point 280. Tilt and shift program 70 also determines that shift point 275 must be directly above shift point 285.

Tilt and shift program 70 calculates the degree of shift required to maximize shift point 270 to a vertical orientation with shift point 280. In the depicted embodiment, line 272 represents the orientation between shift point 270 and shift point 280 before shift correction. Line 277 represents the desired orientation between shift point 270 and shift point 280 after shift correction. Tilt and shift program 70 measures angle 290, which is the angle at the intersection of lines 272 and 277. In the depicted embodiment, tilt and shift program 70 determines that angle 290 is 5°.

Tilt and shift program 70 calculates the degree of shift required to maximize shift point 275 to a vertical orientation with shift point 285. In the depicted embodiment, line 282 represents the orientation between shift point 275 and shift point 285 before shift correction. Line 287 represents the orientation between shift point 275 and shift point 285 after shift correction. Tilt and shift program 70 measures angle 295, which is the angle at the intersection of lines 282 and 287. In the depicted embodiment, tilt and shift program 70 determines that angle 295 is 27°.

Tilt and shift program 70 determines that angle 290 must be 0° in order for shift point 270 to be vertical to shift point 280. Tilt and shift program 70 determines that angle 295 must be 0° in order for shift point 275 to be vertical to shift point 285. Tilt and shift program 70 accesses shift database 80 to determine how to adjust optical lens 20 in order to maximize shift point 270 to a vertical orientation with shift point 280 and to maximize shift point 275 to a vertical orientation with shift point 285. Tilt and shift program 70 determines how to adjust optical lens 20 so that angles 290 and 295 are as close to 0° as possible. In the depicted embodiment, tilt and shift program 70 determines from the rules stored by shift database 80 that optical lens 20 must shift up 7 mm. Tilt and shift program 70 sends an instruction to image capture program 60 to electromechanically shift optical lens 20 up 7 mm.

In one embodiment, tilt and shift program 70 measures angle 290 and angle 295 again. Tilt and shift program 70 determines that angle 290 and angle 295 are each measured to be 0°. Tilt and shift program 70 determines that shift point 270 is vertical to shift point 280 and shift point 275 is vertical to shift point 285. In another embodiment, angle 290 and angle 295 are not measured to be 0°. Tilt and shift program 70 measures angle 290 and angle 295. Tilt and shift program 70 accesses shift database 80 and determines, based on the new measurements of angle 290 and angle 295, that optical lens 20 must be shifted up 4 mm.

The image in FIG. 2C shows an exaggerated perspective that requires a very wider focal length or possible shift movements of optical lens 20 in order to adjust converging lines 272 and 282 so that angles 290 and 295 approach 0 degrees. In yet another embodiment, tilt and shift program 70 determines that the orientation selected by the user cannot be achieved given the current location of image capturing device 10. Tilt and shift program 70 accesses shift database 80 and accesses instructions to achieve the orientation selected by the user. Tilt and shift program 70 causes the instructions to be displayed on display 30. Instructions may include directions for the user. For example, an instruction may direct the user to alter the settings to change the composition of the image and to tilt image capturing device 10 down. Tilt and shift program 70 may also send an instruction to image capture program 60 to electromechanically shift optical lens 20 up.

In yet another embodiment, tilt and shift program 70 accesses shift database 80 to access shapes for shape normalization of object 260. Tilt and shift program 70 prompts the user to select a shape for shape normalization of the subject of the image. The user, using UI 40, selects a shape for shape normalization of object 260. The user, using UI 40, selects a shape and a specific orientation for the shape. For example, the user selects a rectangle oriented vertically. Tilt and shift program 70 uses the selected shape to normalize object 260. In one embodiment, tilt and shift program 70 prompts the user to approve or disapprove of shape normalization of object 260.

Figure 3:
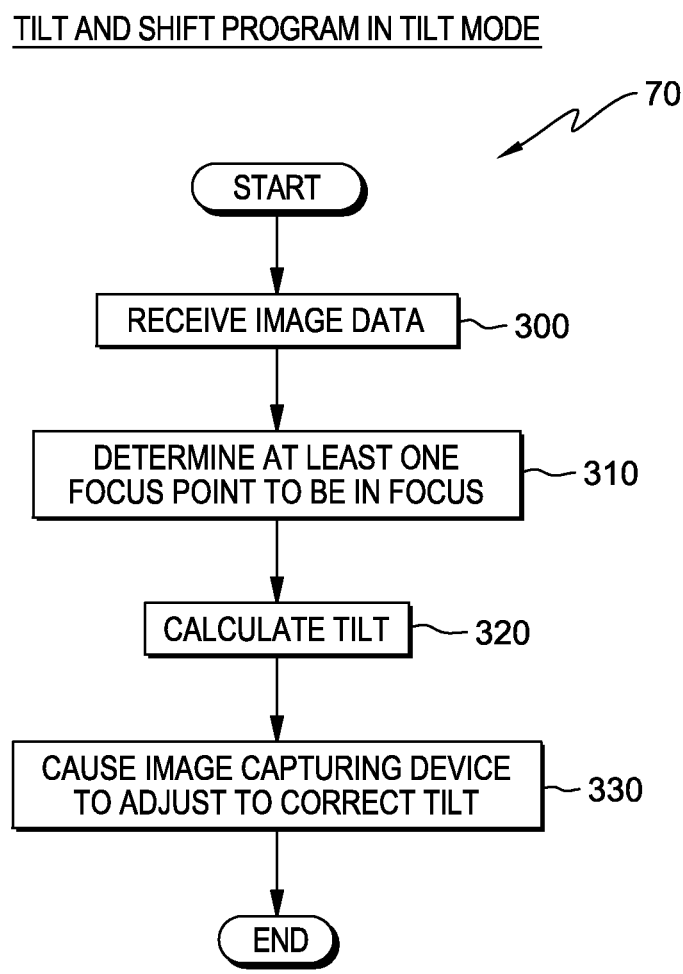
FIG. 3 is a flowchart depicting the steps of the tilt and shift program in tilt mode, in accordance with one embodiment of the present invention.

FIG. 3 is a flowchart depicting operational steps of tilt and shift program 70 correcting for tilt of an image captured by image capturing device 10, in accordance with one embodiment of the present invention.

Initially, the user situates image capturing device 10 in a desired position. The user, using UI 40, selects the initial exposure mode and configures exposure settings, such as aperture. In one embodiment, the exposure is automated. In another embodiment, the user selects a range of exposure values. The user, using UI 40, selects tilt and shift program 70 to operate on the image capturing device 10. In the depicted embodiment, the user selects tilt mode of tilt and shift program 70. In another embodiment, the user selects both tilt and shift mode. In yet another embodiment, the user selects only shift mode.

Light passes through optical lens 20. Image sensor 50 absorbs light, converts it into an electronic signal, and sends the signal to image capture program 60. Image capture program 60 receives the electronic signal from image sensor 50. Image capture program 60 adjusts autofocus to bring the subject matter into focus. Image capture program 60 determines a distance between subject matter at a focus point automatically selected by image capture program 60 and an autofocus pixel sensor associated with the focus point. In one embodiment, image capture program 60 determines image data, which includes a captured image and data required to calculate tilt and shift such as focal length, aperture, subject distance, and the angle between the axis and image capturing device 10. In one embodiment, image capture program 60 sends some or all of the image data to tilt and shift program 70.

In the depicted embodiment, image capture program 60 causes the captured image to be displayed on display 30. The user, using UI 40, can interact with the captured image. Image capture program 60 sends image data for the captured image to tilt and shift program 70.

In step 300, tilt and shift program 70 receives image data from image capture program 60 for the captured image. In one embodiment, image data includes focal length, aperture, subject distance, and the angle between the axis and image capturing device 10. In another embodiment, tilt and shift program 70 may access image capture program 60 and determine image data.

In step 310, tilt and shift program 70 determines at least one focus points of a plurality of focus points to be in focus in the final image. In the depicted embodiment, tilt and shift program 70 prompts the user to selects at least two focus points. The user, using UI 40, selects at least two focus points. In another embodiment, the user, using UI 40, selects one or more points that are not focus points as focus points. For example, a point that is not a focus point may be a point on the captured image that is not associated with a pixel sensor. In this example, tilt and shift program 70 may determine an average of the image data (e.g. exposure, distance, etc.) for nearby points that are associated with pixel sensors to determine image data for the point that is not associated with a pixel sensor. In yet another embodiment, the user, using UI 40, selects a combination of focus points and points that are not focus points as focus points. In the depicted embodiment, tilt and shift program 70 visualizes the one or more selected focus points on display 30. For example, tilt and shift program 70 uses a distinct shape to represent each of the one or more selected focus points. In another example, tilt and shift program 70 uses a distinct color to represent each of the one or more selected focus points.

In another embodiment, tilt and shift program 70 prompts the user to select one or more focus points of the plurality of focus points that the user does not want to be in focus in the final image for creative purposes. The user, using UI 40, selects one or more focus points that are to be out of focus in the image. In another embodiment, tilt and shift program 70 determines that the focus points that were not selected by the user as focus points are out of the plane of focus. In the depicted embodiment, tilt and shift program 70 visualizes the one or more focus points that are out of focus. For example, tilt and shift program 70 makes adjustments or instructs the user to make adjustments to focus, aperture, camera orientation, and tilt that will result in each of the one or more focus points lying outside the plane of focus.

In another embodiment, tilt and shift program 70 displays a depth map before the user selects focus points. In this embodiment, a depth map is an overlay displayed over the captured image that indicates which focus points are in focus and which focus points are out of focus. Tilt and shift program 70 uses the received image data to determine which focus points are in focus and which focus points are out of focus. For example, tilt and shift program 70 selects the focus points that the depth map indicates are in focus as focus points. In another example, the user uses the depth map to select focus points that are to remain out of focus in the final image after adjustments are made to aperture, tilt, and focus.

In step 320, tilt and shift program 70 calculates tilt based on the received image data and the at least one selected focus point. In the depicted embodiment, tilt and shift program 70 calculates tilt by using the Scheimpflug principle. Tilt and shift program 70 use the Scheimpflug principle to calculate the degree of tilt required for the plane of focus so that it aligns with the subject plane. For example, tilt and shift program 70 determines that the plane of focus must be tilted 5° so that it is parallel to the subject plane.

In one embodiment, tilt and shift program 70 determines a range of tilt values based on the focus points selected by the user. For example, tilt and shift program 70 determines a range of 3°-8° of tilt. In one embodiment, tilt and shift program 70 causes the range of tilt values to be displayed on display 30. The user, using UI 40, can accept or reject the range of tilt values determined by tilt and shift program 70. The user may also alter the aperture and provide an indication to tilt and shift program 70 to calculate new tilt values based on the change in aperture. In one embodiment, the user, using UI 40, manually enters a range of tilt values for tilt and shift program 70 to remain within when correcting tilt.

In step 330, tilt and shift program 70 causes image capturing device to adjust to correct tilt. In the depicted embodiment, tilt and shift program 70 corrects for tilt by sending an instruction to image capture program 60 to electromechanically adjust the focus of optical lens 20. For example, tilt and shift program 70 instructs image capture program 60 to change the focal length. In one embodiment, image capture program 60 uses servomechanism to tilt optical lens 20. In another embodiment, tilt and shift program 70 instructs image capture program 60 to change the aperture.

Figure 4:
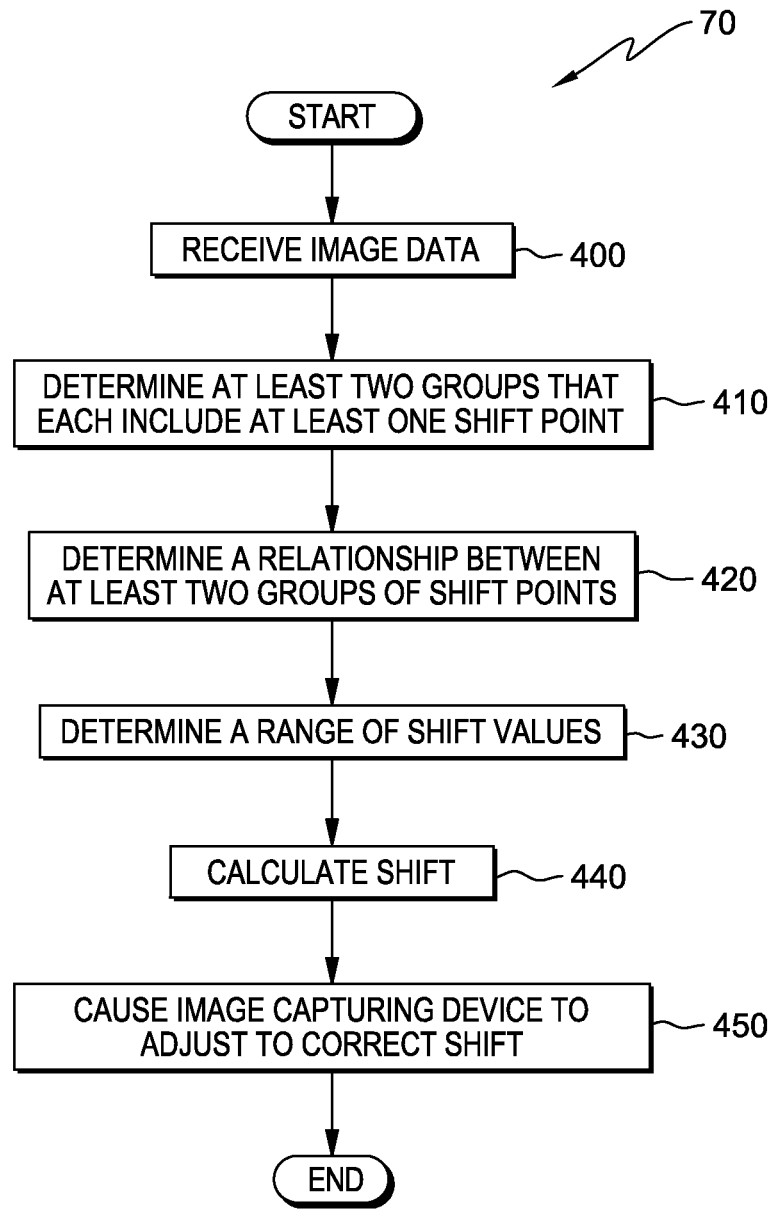
FIG. 4 is a flowchart depicting the steps of the tilt and shift program in shift mode, in accordance with one embodiment of the present invention.

FIG. 4 is a flowchart depicting operational steps of tilt and shift program 70 correcting shift of an image captured by image capturing device 10, in accordance with one embodiment of the present invention.

Initially, the user situates image capturing device 10 in a desired position. The user, using UI 40, selects the initial exposure mode and configures exposure settings, such as aperture. In one embodiment, the exposure is automated. In another embodiment, the user selects a range of exposure values. The user, using UI 40, selects tilt and shift program 70 to operate on the image capturing device 10. In the depicted embodiment, the user selects shift mode of tilt and shift program 70. In another embodiment, the user selects tilt mode and shift mode. In yet another embodiment, the user selects only tilt mode.

Light passes through optical lens 20. Image sensor 50 absorbs light, converts it into an electronic signal, and sends the signal to image capture program 60. Image capture program 60 receives the electronic signal from image sensor 50. Image capture program 60 adjusts autofocus to bring the subject matter into focus. Image capture program 60 determines a distance between subject matter at a focus point automatically selected by image capture program 60 and an autofocus pixel sensor associated with the focus point. In one embodiment, image capture program 60 determines image data, which includes a captured image and data required to calculate tilt and shift such as focal length, aperture, subject distance, and the angle between the axis and image capturing device 10. In one embodiment, image capture program 60 sends some or all of the image data to tilt and shift program 70.

In the depicted embodiment, image capture program 60 causes the captured image to be displayed on display 30. The user, using UI 40, can interact with the captured image. Image capture program 60 sends image data for the captured image to tilt and shift program 70.

In step 400, tilt and shift program 70 receives image data from image capture program 60 for the captured image. In one embodiment, image data includes focal length, aperture, subject distance, and the angle between the axis and image capturing device 10. In another embodiment, tilt and shift program 70 may access image capture program 60 and determine image data.

In step 410, tilt and shift program 70 determines at least two groups that each include at least one shift point. In the depicted embodiment, tilt and shift program 70 prompts the user to selects at least two shift points. Tilt and shift program 70 determines a group for each of the at least two selected shift points. In the depicted embodiment, tilt and shift program 70 prompts the user to select a group for each of the one or more selected shift points. The user, using UI 40, selects a group for each of the one or more selected shift points. In the depicted embodiment, tilt and shift program 70 visualizes the selected group for each of the one or more selected shift points. For example, tilt and shift program 70 uses a distinct shape to represent each of the one or more selected shift points of a selected group. Tilt and shift program 70 uses a different distinct shape to represent each group of selected shift points.

In step 420, tilt and shift program 70 determines a spatial relationship between at least two groups of shift points. In the depicted embodiment, tilt and shift program 70 prompts the user to indicate a spatial relationship between at least two groups of shift points. For example, tilt and shift program 70 prompts the user to select a first group of shift points determined in step 410, and indicate if the first group of shift points should be horizontal, vertical, or parallel to a second group of shift points.

The user may also indicate a spatial relationship between the first group of shift points and other groups of shift points. For example, if the user selected five different groups of shift points, the user may indicate a spatial relationship between the first group of shift points and each of the remaining four groups of shift points. The user may also indicate a spatial relationship between the remaining four groups. For example, the third group is horizontal to the fifth group.

In step 430, tilt and shift program 70 determines a range of shift values to be displayed on display 30. In the depicted embodiment, tilt and shift program 70 determines a range of shift values based on the shift points selected by the user. For example, tilt and shift program 70 determines a range of 0.8 mm-2 mm of shift up. Tilt and shift program 70 causes the range of shift values to be displayed on display 30. The user, using UI 40, can accept or reject the range of shift values determined by tilt and shift program 70. In one embodiment, the user, using UI 40, manually enters a range of shift values for tilt and shift program 70 to remain within when correcting shift.

In step 440, tilt and shift program 70 calculates shift based on the received image data, the determined shift points, the determined spatial relationships between the groups of shift points, and the range of shift values. In the depicted embodiment, tilt and shift program 70 calculates shift by first determining the difference between the current location of at least one shift point and the location selected by the user for the at least one shift point. For example, tilt and shift program 70 measures the angle between the current location of at least one shift point and the location selected by the user for the at least one shift point. Tilt and shift program 70 measures the angle with respect to a second shift point that will remain in the same location. Tilt and shift program 70 accesses shift database 80 and, using a set of pre-determined rules, tilt and shift program 70 determines how to adjust optical lens 20 to correct shift. For example, tilt and shift program 70 determines that optical lens 20 must be shifted 2 mm to correct shift.

In one embodiment, tilt and shift program 70 takes into account the position of image capturing device 10 when calculating tilt and shift. For example, tilt and shift program 70 determines that image capturing device 10 is on its side, and rotates the lens if necessary to accommodate the direction in which the shift and tilt movements must be made.

In step 450, tilt and shift program 70 causes image capturing device to adjust to correct shift. In the depicted embodiment, tilt and shift program 70 corrects for shift by sending an instruction to image capture program 60 to electromechanically adjust the focus of optical lens 20. For example, tilt and shift program 70 instructs image capture program 60 to change the focal length. In one embodiment, image capture program 60 uses servomechanism to tilt optical lens 20.

In one embodiment, tilt and shift program 70 accesses shift database 80 to access shapes for shape normalization of the object of the captured image. Tilt and shift program 70 prompts the user to select a shape for shape normalization of the subject of the image. The user, using UI 40, selects a shape for shape normalization of the subject of the image. The user, using UI 40, selects a shape and a specific orientation for the shape. For example, the user selects a rectangle oriented vertically to normalize the subject of an image, such as a tall building. Tilt and shift program 70 uses the selected shape to normalize the tall building. The user shifts the shape and adjusts the size to superimpose over the subject in the example, which is a tall building. In one embodiment, tilt and shift program 70 prompts the user to approve or disapprove of shape normalization of the object of the captured image.

In one embodiment, tilt and shift program 70 prompts the user that the resulting shift parameters are outside of the selected ranges of shift values. For example, if tilt and shift program 70 is unable to achieve a result within the range of shift values selected by the user, tilt and shift program 70 causes suggested values to be displayed on display 30. Suggested values may, for example, be values that tilt and shift program 70 determined in step 440. In another embodiment, tilt and shift program 70 accesses instructions from shift database 80. Instructions may, for example, direct the user to capture an image of the object from a different location. An instruction may be for the user to move backward and away from the object 20 feet. Tilt and shift program 70 causes the instructions to be displayed on display 30.

Figure 5:
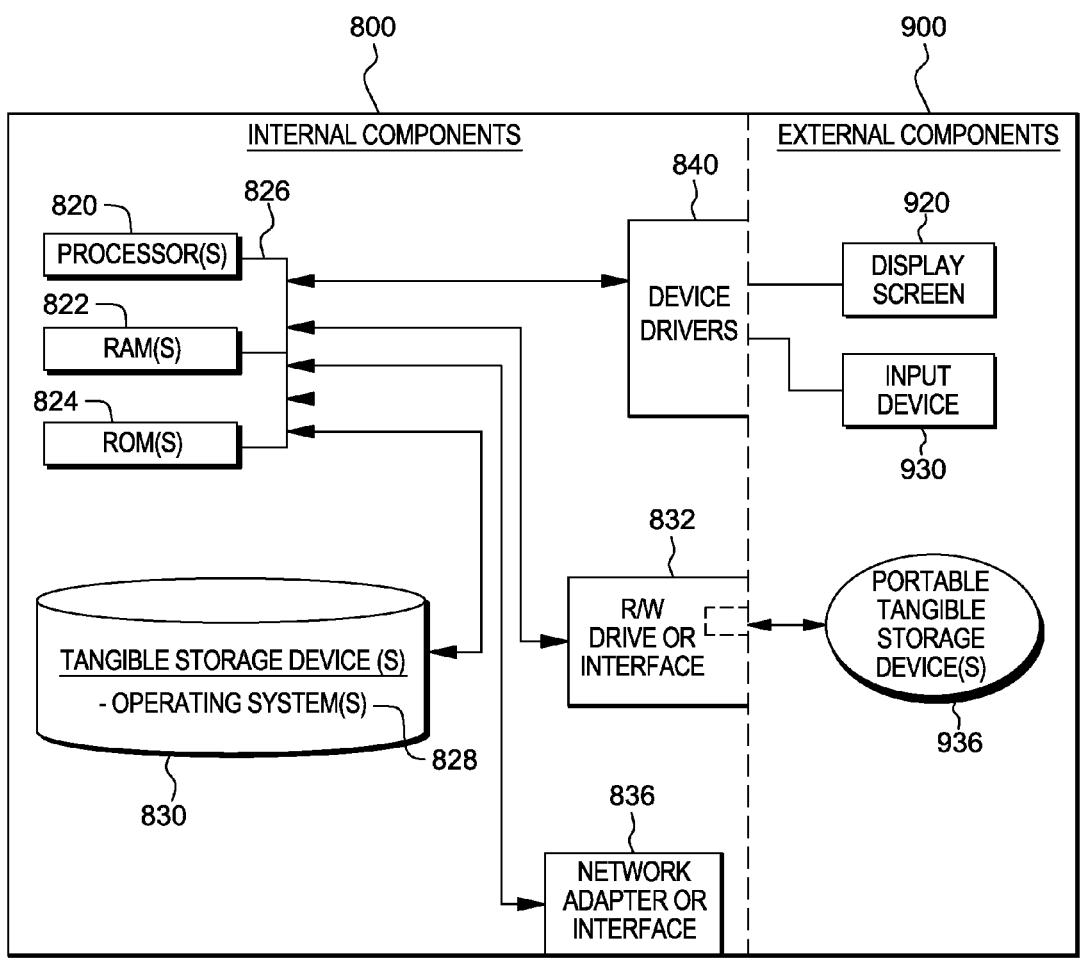
FIG. 5 depicts a block diagram of components of the image capturing device of FIG. 1, in accordance with one embodiment of the present invention.

Image capturing device 10 includes respective sets of internal components 800 and external components 900 illustrated in FIG. 5. Internal components 800 include one or more processors 820, one or more computer-readable RAMs 822 and one or more computer-readable ROMs 824 on one or more buses 826, one or more operating systems 828 and one or more computer-readable storage devices 830. The one or more operating systems 828 and programs UI 40, image capture program 60 and tilt and shift program 70, and shift database 80 are stored on one or more of the respective computer-readable storage devices 830 for execution by one or more of the respective processors 820 via one or more of the respective RAMs 822 (which typically include cache memory). In the illustrated embodiment, each of the computer-readable storage devices 830 is a magnetic disk storage device of an internal hard drive. Alternatively, each of the computer-readable storage devices 830 is a semiconductor storage device such as ROM 824, EPROM, flash memory or any other computer-readable storage device that can store but does not transmit a computer program and digital information.

Internal components 800 also include a R/W drive or interface 832 to read from and write to one or more portable computer-readable storage devices 936 that can store but do not transmit a computer program, such as a CD-ROM, DVD, memory stick, magnetic tape, magnetic disk, optical disk or semiconductor storage device. The programs UI 40, image capture program 60 and tilt and shift program 70, and shift database 80 can be stored on one or more of the respective portable computer-readable storage devices 936, read via the respective R/W drive or interface 832 and loaded into the respective hard drive or tangible storage device 830. The term "computer-readable storage device" does not encompass signal propagation media such as copper cables, optical fibers and wireless transmission media.

Internal components 800 also include a network adapter or interface 836 such as a TCP/IP adapter card or wireless communication adapter (such as a 4G wireless communication adapter using OFDMA technology). The programs UI 40, image capture program 60 and tilt and shift program 70, and shift database 80 can be downloaded to the respective computing/processing devices from an external computer or external storage device via a network (for example, the Internet, a local area network or other, wide area network or wireless network) and network adapter or interface 836. From the network adapter or interface 836, the programs are loaded into the respective hard drive or tangible storage device 830. The network may comprise copper wires, optical fibers, wireless transmission, routers, firewalls, switches, gateway computers and/or edge servers.

External components 900 include a display screen 920 and input device 930. Internal components 800 also include device drivers 840 to interface to display screen 920 for imaging and to input device 930 for registering user input. The device drivers 840, R/W drive or interface 832 and network adapter or interface 836 comprise hardware and software (stored in tangible storage device 830 and/or ROM 824).

The programs can be written in various programming languages (such as Java, C+) including low-level, high-level, object-oriented or non object-oriented languages. Alternatively, the functions of the programs can be implemented in whole or in part by computer circuits and other hardware (not shown). Based on the foregoing, a computer system, method and program product have been disclosed for calculating corrections for tilt and shift in an image.

What is claimed is:

1. A method for calculating corrections for tilt in an image, the method comprising the steps of:
   one or more processors receiving a digitized image from a camera;
   the one or more processors initiating display of the digitized image in a screen on the camera, the screen having user-selectable focus points; and
   the one or more processors receiving from a user a focus point selection of an area of the displayed image to correct for tilt, and in response:
     the one or more processors determining a range of tilt values based on the selected focus point;
     the one or more processors initiating the display of the range of tilt values in the screen on the camera; and
     the one or more processors receiving an indication that the user has accepted the range of tilt values, and in response, the one or more processors correcting the digitized image for tilt in the area such that an object is in focus in the area based on the accepted range of tilt values.

2. The method of claim 1, further comprising the steps of:
   the one or more processors identifying the object underneath the selected focus point, the object extending beyond the area selected by the user, and in response, the one or more processors correcting for tilt for the portions of the object underneath the selected focus point and the portions of the object extending beyond the area selected by the user.

3. The method of claim 2, further comprising the steps of:
   the one or more processors prompting the user to select a shape that represents the desired shape of the identified object underneath the selected focus point; and
   the one or more processors receiving an indication of a selected shape.

4. The method of claim 1, wherein the step of the one or more processors receiving from a user a focus point selection of an area of the displayed image to correct for tilt comprises:

the one or more processors blurring pixels of the digitized image having distance values outside a depth of field of the camera;

the one or more processors prompting a user to select at least one focus point of the user-selectable focus points inside the depth of field of the camera in the digitized image to be in focus; and the one or more processors receiving an indication that the user selected the at least one focus point to be in focus.

5. The method of claim 1, wherein the screen on the camera is a touch screen and wherein the user-selectable focus points correspond to touch points on the touch screen.

6. A method for calculating corrections for shift in an image, the method comprising the steps of:

one or more processors receiving a digitized image from a camera;

the one or more processors initiating display of the digitized image in a screen on the camera, the screen having user-selectable focus points;

the one or more processors receiving from a user a selection of a first group of focus points and a second group of focus points, wherein no focus point in the first group is included in the second group;

the one or more processors receiving a spatial relationship between the first group and the second group of focus points selected by the user;

the one or more processors determining a range of possible shift values to correct for shift in the digitized image based on the selected spatial relationship between the first group and second group of focus points;

the one or more processors calculating parameters to correct for shift of the digitized image based on the determined range of possible shift values; and the one or more processors correcting for shift based on the calculated parameters.

7. The method of claim 6, wherein the step of the one or more processors receiving a spatial relationship between the first group and the second group of focus points selected by the user comprises:

the one or more processors prompting the user to indicate a spatial relationship between the first group and second group of focus points; and the one or more processors receiving an indication of the spatial relationship between the first group and second group of focus points.

8. The method of claim 6, further comprising:

the one or more processors causing the range of possible shift values to be displayed in the screen on the camera; and the one or more processors prompting the user to approve or disapprove of the range of possible shift values displayed in the screen on the camera.

9. The method of claim 8, further comprising:

the one or more processors receiving an indication that the user has disapproved of the range of possible shift values; and the one or more processors prompting the user to enter a new range of possible shift values.

10. The method of claim 6, wherein the step of the one or more processors correcting for shift based on the calculated parameters comprises the one or more processors displaying instructions to the user in the screen on the camera to correct for shift.

11. The method of claim 10, wherein the instructions displayed in the screen on the camera include instructions indicating where to physically move the camera to correct for shift.

12. A computer program product for calculating corrections for tilt in an image, the computer program product comprising:

one or more computer-readable storage devices and program instructions stored on the one or more computer-readable storage devices, the program instructions comprising:

program instructions to receive a digitized image from a camera;

program instructions to initiate display of the digitized image in a screen on the camera, the screen having user-selectable focus points; and program instructions to receive from a user a focus point selection of an area of the displayed image to correct for tilt, and in response:

program instructions to determine a range of tilt values based on the selected focus point;

program instructions to initiate the display of the range of tilt values in the screen on the camera; and program instructions to receive an indication that the user has accepted the range of tilt values, and in response, program instructions to correct the digitized image for tilt in the area such that an object is in focus in the area based on the accepted range of tilt values.

13. The computer program product of claim 12, further comprising:

program instructions, stored on the one or more computer-readable storage devices, to identify the object underneath the selected focus point, the object extending beyond the area selected by the user, and in response, program instructions to correct for tilt for the portions of the object underneath the selected focus point and the portions of the object extending beyond the area selected by the user.

14. The computer program product of claim 13, further comprising:

program instructions, stored on the one or more computer-readable storage media devices, to prompt the user to select a shape that represents the desired shape of the identified object underneath the selected focus point; and program instructions, stored on the one or more computer-readable storage media devices, to receive an indication of a selected shape.

15. The computer program product of claim 12, wherein the screen on the camera is a touch screen and wherein the user-selectable focus points correspond to touch points on the touch screen.

16. The computer program product of claim 12, further comprising program instructions stored on the one or more computer-readable storage devices, the program instructions comprising:

program instructions to receive from a user a selection of a first group of focus points and a second group of focus points, wherein no focus point in the first group is included in the second group;

program instructions to receive a spatial relationship between the first group and the second group of focus points selected by the user;

program instructions to determine a range of possible shift values to correct for shift in the digitized image based on the selected spatial relationship between the first group and second group of focus points;

program instructions to calculate parameters to correct for shift of the digitized image based on the determined range of possible shift values; and program instructions to correct for shift based on the calculated parameters.

17. The computer program product of claim 16, wherein the program instructions to receive a spatial relationship between the first group and the second group of focus points selected by the user comprise:

program instructions to prompt the user to indicate a spatial relationship between the first group and second group of focus points; and program instructions to receive an indication of the spatial relationship between the first group and second group of focus points.

18. The computer program product of claim 16, further comprising:

program instructions, stored on the one or more computer-readable storage devices, to cause the range of possible shift values to be displayed in the screen on the camera; and program instructions, stored on the one or more computer-readable storage devices, to prompt the user to approve or disapprove of the range of possible shift values displayed in the screen on the camera.

19. The computer program product of claim 18, further comprising:

program instructions, stored on the one or more computer-readable storage devices, to receive an indication that the user has disapproved of the range of possible shift values; and program instructions, stored on the one or more computer-readable storage devices, to prompt the user to enter a new range of possible shift values.

* * * * *